US010136421B2

(12) United States Patent
Lyu et al.

(10) Patent No.: US 10,136,421 B2
(45) Date of Patent: Nov. 20, 2018

(54) CARRIER INDICATION METHOD, USER EQUIPMENT, AND BASE STATION

(71) Applicant: HUAWEI TECHNOLOGIES CO., LTD., Shenzhen (CN)

(72) Inventors: Yongxia Lyu, Beijing (CN); Wen Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 217 days.

(21) Appl. No.: 14/817,609

(22) Filed: Aug. 4, 2015

(65) Prior Publication Data

US 2015/0341915 A1 Nov. 26, 2015

Related U.S. Application Data

(63) Continuation of application No. PCT/CN2013/071382, filed on Feb. 5, 2013.

(51) Int. Cl.
| | |
|---|---|
| H04L 12/50 | (2006.01) |
| H04W 72/04 | (2009.01) |
| H04L 5/14 | (2006.01) |
| H04L 5/00 | (2006.01) |
| H04W 16/10 | (2009.01) |

(52) U.S. Cl.
CPC ......... *H04W 72/042* (2013.01); *H04L 5/0007* (2013.01); *H04L 5/14* (2013.01); *H04W 16/10* (2013.01); *H04W 72/04* (2013.01)

(58) Field of Classification Search
CPC .................................................. H04W 72/042
USPC ......................................................... 370/339
See application file for complete search history.

(56) References Cited

U.S. PATENT DOCUMENTS

| | | | |
|---|---|---|---|
| 2011/0243040 A1 | 10/2011 | Khan et al. | |
| 2015/0043369 A1* | 2/2015 | Kim | H04J 11/005 370/252 |

FOREIGN PATENT DOCUMENTS

| | | |
|---|---|---|
| CN | 101772191 A | 7/2010 |
| CN | 102083205 A | 6/2011 |
| CN | 102884731 A | 1/2013 |
| EP | 2 501 196 A1 | 9/2012 |

(Continued)

OTHER PUBLICATIONS

International Search Report dated Nov. 14, 2013 in corresponding International Application No. PCT/CN2013/071382.

(Continued)

*Primary Examiner* — Dang Ton
(74) *Attorney, Agent, or Firm* — Staas & Halsey LLP

(57) ABSTRACT

This application discloses a carrier indication method, user equipment, and a base station. The method includes: receiving, by user equipment, first information sent by a base station; if the user equipment is capable of transmitting uplink data and downlink data on a carrier, determining, by the user equipment according to the first information, a carrier used for transmitting first-type information; and transmitting, by the user equipment, the first-type information on the determined carrier, where the first-type information includes at least one of the following: uplink data, downlink data, and scheduling information. In this application, user equipment determines, according to first information sent by a base station, a carrier used for transmitting information, and therefore, can normally transmit information.

18 Claims, 3 Drawing Sheets

(56) References Cited

FOREIGN PATENT DOCUMENTS

WO  WO 2007/020292  A1  2/2007
WO  WO 2010/013970  A2  2/2010
WO  WO 2010/013970  A3  2/2010

OTHER PUBLICATIONS

International Search Report dated Nov. 14, 2013 in International Patent Application No. PCT/CN2013/071382.
Extended European Search Report dated Dec. 2, 2015 in European Patent Application No. 13874776.1.

* cited by examiner

CARRIER INDICATION METHOD, USER EQUIPMENT, AND BASE STATION

CROSS-REFERENCE TO RELATED APPLICATIONS

This application is a continuation of International Application No. PCT/CN2013/071382, filed on Feb. 5, 2013, which is hereby incorporated by reference in its entirety.

TECHNICAL FIELD

This application relates to the field of communications, and in particular, to a carrier indication method, user equipment, and a base station.

BACKGROUND

With the popularity of smartphones and rapid development of high-speed mobile Internet technologies, communications systems, such as International Mobile Telecommunications 2000 (3G), a Worldwide Interoperability for Microwave Access system (WiMAX for short), a Long Term Evolution system (LTE for short), and a Long Term Evolution Advanced system (LTE-A for short), which are involved in various wireless broadband access technologies, keep emerging. In the foregoing wireless communications system, on same time and frequency resources, data can only be received or sent between a base station and user equipment, but data cannot be received and sent simultaneously between a base station and user equipment. For example, in a Frequency Division Duplex (FDD for short) system, a base station sends data to a user and receives data from the user separately by using different frequency resources; and in a Time Division Duplex (TDD for short) system, a base station sends data to a user and receives data from the user separately by using different time resources.

In evolution of the wireless broadband access technologies, in a case of considering neither a higher-order modulation technology nor configuration of more transmit and receive antennas, usually, a greater communication bandwidth is used to obtain a higher peak rate, for example, an LTE system supports a maximum system bandwidth of 20 MHz, while an LTE-A system can support a maximum system bandwidth of 100 MHz by using a carrier aggregation technology. However, wireless spectrum resources are very rare and expensive, causing that the limited spectrum resources become a barrier to further improvement of a system capacity.

To improve a utilization rate of spectrum resources, a new full-duplex communications technology is proposed. A specific technical means is used to reduce interference caused when a communications device receives and transmits signals simultaneously, so that the communications device can implement bidirectional transmission of communication data, where the communications device includes a base station, user equipment (UE for short), and the like, and the technical means may be at least one of the following: antennas are appropriately arranged on a device to enable signals from multiple transmit antennas to just cancel out each other at a receive antenna, or a known signal transmitted by a transmit circuit is used in a receive circuit to perform interference cancellation. Notably, the new full-duplex communication herein refers to that: a base station and UE can perform bidirectional data transmission on a same time-frequency resource. For example, in an LTE system, if a base station is full-duplex, two UEs that are sufficiently far away from each other and that are managed by the eNB can receive and transmit data and/or signaling on a same time-frequency resource; in this way, a spectrum utilization rate can be improved, where the base station may be an evolved NodeB, which is briefly referred to as an eNodeB or an eNB.

In an FDD system, a full-duplex eNB is used and can support transmission of uplink data and downlink data on a same carrier, for example, downlink data and uplink data are transmitted on an uplink carrier, and uplink data and downlink data are transmitted on a downlink carrier.

However, if UE managed by a full-duplex eNB also has a duplex capability, the UE does not know a carrier that transmits uplink and downlink data or signaling, and therefore, cannot effectively transmit information.

SUMMARY

This application provides a carrier indication method, user equipment, and a base station, so as to resolve a problem in related technologies that, if both UE and a base station have a duplex capability, the UE cannot effectively transmit information.

According to a first aspect, an embodiment of the present invention provides a carrier indication method, including: receiving, by user equipment, first information sent by a base station; if the user equipment is capable of transmitting uplink data and downlink data on a carrier, determining, by the user equipment according to the first information, a carrier used for transmitting first-type information; and transmitting, by the user equipment, the first-type information on the determined carrier, where the first-type information includes at least one of the following: uplink data, downlink data, and scheduling information.

In a first possible implementation manner of the first aspect, the determining, by the user equipment according to the first information, a carrier used for transmitting first-type information includes: determining, by the user equipment according to a correspondence between the first information and the carrier used for transmitting the first-type information, the carrier used for transmitting the first-type information.

With reference to the foregoing possible implementation manner, in a second possible implementation manner of the first aspect, the determining, by the user equipment according to a correspondence between the first information and the carrier used for transmitting the first-type information, the carrier used for transmitting the first-type information includes: determining, by the user equipment, whether the first information belongs to a first predetermined set or a second predetermined set; and if the first information belongs to the first predetermined set, determining, by the user equipment, to transmit the first-type information on a first carrier; or if the first information belongs to the second predetermined set, determining, by the user equipment, to transmit the first-type information on a second carrier.

With reference to either of the foregoing possible implementation manners, in a third possible implementation manner of the first aspect, the determining, by the user equipment according to a correspondence between the first information and the carrier used for transmitting the first-type information, the carrier used for transmitting the first-type information includes: determining, by the user equipment according to the first information, a subframe pattern corresponding to the first information; and determining, by the user equipment according to the subframe pattern, a carrier on which the first-type information is transmitted in each subframe.

With reference to any one of the foregoing possible implementation manners, in a fourth possible implementation manner of the first aspect, the first information includes the subframe pattern.

With reference to any one of the foregoing possible implementation manners, in a fifth possible implementation manner of the first aspect, the first information includes one of the following: a predetermined value and user equipment-specific information.

With reference to any one of the foregoing possible implementation manners, in a sixth possible implementation manner of the first aspect, the user equipment-specific information includes one of the following: a cell radio network temporary identifier C-RNTI and a temporary cell radio network temporary identifier TC-RNTI that correspond to the user equipment.

With reference to any one of the foregoing possible implementation manners, in a seventh possible implementation manner of the first aspect, the determining, by the user equipment according to a correspondence between the first information and the carrier used for transmitting the first-type information, the carrier used for transmitting the first-type information includes: the first information being corresponding to at least one of the following: a subframe pattern of a first carrier and a subframe pattern of a second carrier; and determining, by the user equipment according to the subframe pattern of the first carrier and/or the subframe pattern of the second carrier, a carrier on which the first-type information is transmitted in each subframe.

With reference to any one of the foregoing possible implementation manners, in an eighth possible implementation manner of the first aspect, the transmitting, by the user equipment, the first-type information on the determined carrier includes: receiving, by the user equipment, downlink control information DCI on the determined carrier; and after the user equipment receives the DCI on the determined carrier, determining, by the user equipment according to the DCI, a carrier used for transmitting second-type information, where the second-type information includes: uplink data and/or downlink data.

With reference to any one of the foregoing possible implementation manners, in a ninth possible implementation manner of the first aspect, the determining, by the user equipment according to the DCI, a carrier used for transmitting second-type information includes: the DCI including: first indication information used for indicating that uplink transmission or downlink transmission is to be performed, and second indication information used for indicating a carrier, and determining, by the user equipment according to the first indication information and the second indication information, the carrier used for transmitting the second-type information.

With reference to any one of the foregoing possible implementation manners, in a tenth possible implementation manner of the first aspect, the determining, by the user equipment according to the DCI, a carrier used for transmitting second-type information includes: descrambling, by the user equipment, the DCI by using descrambling information in a descrambling information set; and if the DCI is successfully descrambled by using first descrambling information, determining, by the user equipment, to transmit the second-type information on the first carrier; or if the DCI is successfully descrambled by using second descrambling information, determining, by the user equipment, to transmit the second-type information on the second carrier.

With reference to any one of the foregoing possible implementation manners, in an eleventh possible implementation manner of the first aspect, the descrambling information set includes: at least two predetermined sequences or at least two different C-RNTIs.

With reference to any one of the foregoing possible implementation manners, in a twelfth possible implementation manner of the first aspect, if the descrambling information set includes at least two different C-RNTIs, before the descrambling the DCI, the method further includes: receiving, by the user equipment, the at least two different C-RNTIs allocated by the base station.

With reference to any one of the foregoing possible implementation manners, in a thirteenth possible implementation manner of the first aspect, the determining, by the user equipment according to the DCI, a carrier used for transmitting second-type information includes: determining, by the user equipment according to a correspondence between a number of a CCE in which the DCI is located and the carrier used for transmitting the second-type information, the carrier used for transmitting the second-type information.

With reference to any one of the foregoing possible implementation manners, in a fourteenth possible implementation manner of the first aspect, the determining, by the user equipment according to a correspondence between a number of a CCE in which the DCI is located and the carrier used for transmitting the second-type information, the carrier used for transmitting the second-type information includes: if the number of the CCE in which the DCI is located belongs to a first number set, determining, by the user equipment, to transmit the second-type information on the first carrier; or if the number of the CCE in which the DCI is located belongs to a second number set, determining, by the user equipment, to transmit the second-type information on the second carrier.

With reference to any one of the foregoing possible implementation manners, in a fifteenth possible implementation manner of the first aspect, before the receiving, by user equipment, first information sent by a base station, the method further includes: receiving, by the user equipment, a message that is sent by the base station and that is used for indicating that the base station has a full-duplex capability; and sending, by the user equipment, a first message to the base station, where the first message is used for indicating that the user equipment can receive uplink data and downlink data on a carrier.

According to a second aspect, a carrier indication method is provided, including: in a case in which user equipment is capable of transmitting uplink data and downlink data on a carrier, determining, by a base station, a carrier used for transmitting first-type information by the user equipment, where the first-type information includes at least one of the following: uplink data, downlink data, and scheduling information; sending, by the base station, first information to the user equipment, where there is a correspondence between the first information and the carrier used for transmitting the first-type information; and transmitting, by the base station, the first-type information on the carrier.

In a first possible implementation manner of the second aspect, that there is a correspondence between the first information and the carrier used for transmitting the first-type information includes that: if the first information belongs to a first predetermined set, the carrier used for transmitting the first-type information is a first carrier; or if the first information belongs to a second predetermined set, the carrier used for transmitting the first-type information is a second carrier.

With reference to the foregoing possible implementation manner, in a second possible implementation manner of the second aspect, that there is a correspondence between the first information and the carrier used for transmitting the first-type information includes that: the first information corresponds to a subframe pattern; and the subframe pattern corresponds to a carrier on which the first-type information is transmitted in a subframe.

With reference to either of the foregoing possible implementation manners, in a third possible implementation manner of the second aspect, the first information includes the subframe pattern.

With reference to any one of the foregoing possible implementation manners, in a fourth possible implementation manner of the second aspect, the first information includes one of the following: a predetermined value and user equipment-specific information.

With reference to any one of the foregoing possible implementation manners, in a fifth possible implementation manner of the second aspect, the user equipment-specific information includes one of the following: a cell radio network temporary identifier C-RNTI and a temporary cell radio network temporary identifier TC-RNTI that correspond to the user equipment.

With reference to any one of the foregoing possible implementation manners, in a sixth possible implementation manner of the second aspect, that there is a correspondence between the first information and the carrier used for transmitting the first-type information includes that: the first information corresponds to at least one of the following: a subframe pattern of a first carrier and a subframe pattern of a second carrier; and the subframe pattern of the first carrier and/or the subframe pattern of the second carrier corresponds to a carrier on which the first-type information is transmitted in a subframe.

With reference to any one of the foregoing possible implementation manners, in a seventh possible implementation manner of the second aspect, the transmitting, by the base station, the first-type information on the carrier includes: sending, by the base station, downlink control information DCI to the user equipment on the carrier determined by the base station and used for transmitting the first-type information, where the DCI is used by the user equipment to determine, according to the DCI, a carrier used for transmitting second-type information, and the second-type information includes: uplink data and/or downlink data.

With reference to any one of the foregoing possible implementation manners, in an eighth possible implementation manner of the second aspect, the DCI includes: first indication information used for indicating that uplink transmission or downlink transmission is to be performed, and second indication information used for indicating a carrier.

With reference to any one of the foregoing possible implementation manners, in a ninth possible implementation manner of the second aspect, before the sending, by the base station, downlink control information DCI to the user equipment on the carrier determined by the base station and used for transmitting the first-type information, the method further includes: scrambling, by the base station, the DCI by using scrambling information in a scrambling information set, where if the scrambling information is first scrambling information, the carrier used for transmitting the second-type information is a first carrier; or if the scrambling information is second scrambling information, the carrier used for transmitting the second-type information is a second carrier.

With reference to any one of the foregoing possible implementation manners, in a tenth possible implementation manner of the second aspect, the scrambling information set includes: at least two predetermined sequences or at least two different C-RNTIs.

With reference to any one of the foregoing possible implementation manners, in an eleventh possible implementation manner of the second aspect, if the scrambling information set includes at least two different C-RNTIs, the method further includes: sending, by the base station, the at least two different C-RNTIs to the user equipment.

With reference to any one of the foregoing possible implementation manners, in a twelfth possible implementation manner of the second aspect, there is a correspondence between a number of a CCE in which the DCI is located and the carrier used for transmitting the second-type information.

With reference to any one of the foregoing possible implementation manners, in a thirteenth possible implementation manner of the second aspect, that there is a correspondence between a number of a CCE in which the DCI is located and the carrier used for transmitting the second-type information includes that: if the number of the CCE in which the DCI is located belongs to a first number set, the carrier used for transmitting the second-type information is a first carrier; or if the number of the CCE in which the DCI is located belongs to a second number set, the carrier used for transmitting the second-type information is a second carrier.

With reference to any one of the foregoing possible implementation manners, in a fourteenth possible implementation manner of the second aspect, before the sending, by the base station, first information to the user equipment, the method further includes: sending, by the base station to the user equipment, a message used for indicating that the base station has a full-duplex capability; and receiving, by the base station, a first message sent by the user equipment, where the first message is used for indicating that the user equipment can receive uplink data and downlink data on a carrier.

According to a third aspect, user equipment is provided, including: a transceiver unit, configured to receive first information sent by a base station; and a processing unit, configured to: in a case in which the user equipment is capable of transmitting uplink data and downlink data on a carrier, determine, according to the first information, a carrier used for transmitting first-type information, where the transceiver unit is further configured to transmit the first-type information on the determined carrier, where the first-type information includes at least one of the following: uplink data, downlink data, and scheduling information.

In a first possible implementation manner of the third aspect, the processing unit is configured to determine, in the following manner according to the first information, the carrier used for transmitting the first-type information: determining, by the processing unit according to a correspondence between the first information and the carrier used for transmitting the first-type information, the carrier used for transmitting the first-type information.

With reference to the foregoing possible implementation manner, in a second possible implementation manner of the third aspect, the processing unit is configured to determine, in the following manner according to the correspondence between the first information and the carrier used for transmitting the first-type information, the carrier used for transmitting the first-type information: determining, by the processing unit, whether the first information belongs to a first predetermined set or a second predetermined set; and in a case in which it is determined that the first information belongs to the first predetermined set, determining, by the processing unit, to transmit the first-type information on a first carrier; or in a case in which it is determined that the first information belongs to the second predetermined set, determining, by the processing unit, to transmit the first-type information on a second carrier.

With reference to either of the foregoing possible implementation manners, in a third possible implementation manner of the third aspect, the processing unit is configured to determine, in the following manner according to the correspondence between the first information and the carrier used for transmitting the first-type information, the carrier used for transmitting the first-type information: determining, by the processing unit according to the first information, a subframe pattern corresponding to the first information; and determining, by the processing unit according to the subframe pattern, a carrier on which the first-type information is transmitted in each subframe.

With reference to any one of the foregoing possible implementation manners, in a fourth possible implementation manner of the third aspect, the first information includes the subframe pattern.

With reference to any one of the foregoing possible implementation manners, in a fifth possible implementation manner of the third aspect, the first information includes one of the following: a predetermined value and user equipment-specific information.

With reference to any one of the foregoing possible implementation manners, in a sixth possible implementation manner of the third aspect, the user equipment-specific information includes one of the following: a cell radio network temporary identifier C-RNTI and a temporary cell radio network temporary identifier TC-RNTI that correspond to the user equipment.

With reference to any one of the foregoing possible implementation manners, in a seventh possible implementation manner of the third aspect, the processing unit is configured to determine, in the following manner according to the correspondence between the first information and the carrier used for transmitting the first-type information, the carrier used for transmitting the first-type information: the first information being corresponding to at least one of the following: a subframe pattern of a first carrier and a subframe pattern of a second carrier; and determining, by the processing unit according to the subframe pattern of the first carrier and/or the subframe pattern of the second carrier, a carrier on which the first-type information is transmitted in each subframe.

With reference to any one of the foregoing possible implementation manners, in an eighth possible implementation manner of the third aspect, the transceiver unit is configured to transmit the first-type information on the determined carrier in the following manner: receiving, by the transceiver unit, downlink control information DCI on the determined carrier; and the processing unit is further configured to: after the transceiver unit receives the DCI on the determined carrier, determine, according to the DCI, a carrier used for transmitting second-type information, where the second-type information includes: uplink data and/or downlink data.

With reference to any one of the foregoing possible implementation manners, in a ninth possible implementation manner of the third aspect, the processing unit is configured to determine, in the following manner according to the DCI, the carrier used for transmitting the second-type information: the DCI including: first indication information used for indicating that uplink transmission or downlink transmission is to be performed, and second indication information used for indicating a carrier, and determining, by the processing unit according to the first indication information and the second indication information, the carrier used for transmitting the second-type information.

With reference to any one of the foregoing possible implementation manners, in a tenth possible implementation manner of the third aspect, the processing unit is configured to determine, in the following manner according to the DCI, the carrier used for transmitting the second-type information: descrambling, by the processing unit, the DCI by using descrambling information in a descrambling information set; and in a case in which the DCI is successfully descrambled by using first descrambling information, determining, by the processing unit, to transmit the second-type information on the first carrier; or in a case in which the DCI is successfully descrambled by using second descrambling information, determining, by the processing unit, to transmit the second-type information on the second carrier.

With reference to any one of the foregoing possible implementation manners, in an eleventh possible implementation manner of the third aspect, the descrambling information set includes: at least two predetermined sequences or at least two different C-RNTIs.

With reference to any one of the foregoing possible implementation manners, in a twelfth possible implementation manner of the third aspect, the transceiver unit is further configured to: in a case in which the descrambling information set includes at least two different C-RNTIs, before the DCI is descrambled, receive the at least two different C-RNTIs allocated by the base station.

With reference to any one of the foregoing possible implementation manners, in a thirteenth possible implementation manner of the third aspect, the processing unit is configured to determine, in the following manner according to the DCI, the carrier used for transmitting the second-type information: determining, by the processing unit according to a correspondence between a number of a CCE in which the DCI is located and the carrier used for transmitting the second-type information, the carrier used for transmitting the second-type information.

With reference to any one of the foregoing possible implementation manners, in a fourteenth possible implementation manner of the third aspect, the processing unit is configured to determine, in the following manner according to the correspondence between the number of the CCE in which the DCI is located and the carrier used for transmitting the second-type information, the carrier used for transmitting the second-type information: in a case in which the number of the CCE in which the DCI is located belongs to a first number set, determining, by the processing unit, to transmit the second-type information on the first carrier; or in a case in which the number of the CCE in which the DCI is located belongs to a second number set, determining, by the processing unit, to transmit the second-type information on the second carrier.

With reference to any one of the foregoing possible implementation manners, in a fifteenth possible implementation manner of the third aspect, the transceiver unit is further configured to: before the user equipment receives the first information sent by the base station, receive a message that is sent by the base station and that is used for indicating that the base station has a full-duplex capability; and send a first message to the base station, where the first message is used for indicating that the user equipment can receive uplink data and downlink data on a carrier.

According to a fourth aspect, a base station is provided, including: a processing unit, configured to: in a case in which user equipment is capable of transmitting uplink data and downlink data on a carrier, determine a carrier used for transmitting first-type information by the user equipment, where the first-type information includes at least one of the following: uplink data, downlink data, and scheduling information; and a transceiver unit, configured to send first information to the user equipment, where there is a correspondence between the first information and the carrier used for transmitting the first-type information, where the transceiver unit is further configured to transmit the first-type information on the carrier.

In a first possible implementation manner of the fourth aspect, that there is a correspondence between the first information and the carrier used for transmitting the first-type information includes that: if the first information belongs to a first predetermined set, the carrier used for transmitting the first-type information is a first carrier; or if the first information belongs to a second predetermined set, the carrier used for transmitting the first-type information is a second carrier.

With reference to the foregoing possible implementation manner, in a second possible implementation manner of the fourth aspect, that there is a correspondence between the first information and the carrier used for transmitting the first-type information includes that: the first information corresponds to a subframe pattern; and the subframe pattern corresponds to a carrier on which the first-type information is transmitted in a subframe.

With reference to either of the foregoing possible implementation manners, in a third possible implementation manner of the fourth aspect, the first information includes the subframe pattern.

With reference to any one of the foregoing possible implementation manners, in a fourth possible implementation manner of the fourth aspect, the first information includes one of the following: a predetermined value and user equipment-specific information.

With reference to any one of the foregoing possible implementation manners, in a fifth possible implementation manner of the fourth aspect, the user equipment-specific information includes one of the following: a cell radio network temporary identifier C-RNTI and a temporary cell radio network temporary identifier TC-RNTI that correspond to the user equipment.

With reference to any one of the foregoing possible implementation manners, in a sixth possible implementation manner of the fourth aspect, that there is a correspondence between the first information and the carrier used for transmitting the first-type information includes that: the first information corresponds to at least one of the following: a subframe pattern of a first carrier and a subframe pattern of a second carrier; and the subframe pattern of the first carrier and/or the subframe pattern of the second carrier corresponds to a carrier on which the first-type information is transmitted in a subframe.

With reference to any one of the foregoing possible implementation manners, in a seventh possible implementation manner of the fourth aspect, the transceiver unit is configured to transmit the first-type information on the carrier in the following manner: sending downlink control information DCI to the user equipment on the carrier determined by the base station and used for transmitting the first-type information, where the DCI is used by the user equipment to determine, according to the DCI, a carrier used for transmitting second-type information, and the second-type information includes: uplink data and/or downlink data.

With reference to any one of the foregoing possible implementation manners, in an eighth possible implementation manner of the fourth aspect, the DCI includes: first indication information used for indicating that uplink transmission or downlink transmission is to be performed, and second indication information used for indicating a carrier.

With reference to any one of the foregoing possible implementation manners, in a ninth possible implementation manner of the fourth aspect, the processing unit is further configured to: before the transceiver unit sends the downlink control information DCI to the user equipment, scramble the DCI by using scrambling information in a scrambling information set, where if the scrambling information is first scrambling information, the carrier used for transmitting the second-type information is a first carrier; or if the scrambling information is second scrambling information, the carrier used for transmitting the second-type information is a second carrier.

With reference to any one of the foregoing possible implementation manners, in a tenth possible implementation manner of the fourth aspect, the scrambling information set includes: at least two predetermined sequences or at least two different C-RNTIs.

With reference to any one of the foregoing possible implementation manners, in an eleventh possible implementation manner of the fourth aspect, if the scrambling information set includes at least two different C-RNTIs, the transceiver unit is further configured to send the at least two different C-RNTIs to the user equipment.

With reference to any one of the foregoing possible implementation manners, in a twelfth possible implementation manner of the fourth aspect, there is a correspondence between a number of a CCE in which the DCI is located and the carrier used for transmitting the second-type information.

With reference to any one of the foregoing possible implementation manners, in a thirteenth possible implementation manner of the fourth aspect, that there is a correspondence between a number of a CCE in which the DCI is located and the carrier used for transmitting the second-type information includes that: if the number of the CCE in which the DCI is located belongs to a first number set, the carrier used for transmitting the second-type information is a first carrier; or if the number of the CCE in which the DCI is located belongs to a second number set, the carrier used for transmitting the second-type information is a second carrier.

With reference to any one of the foregoing possible implementation manners, in a fourteenth possible implementation manner of the fourth aspect, the transceiver unit is further configured to: before sending the first information to the user equipment, send, to the user equipment, a message used for indicating that the base station has a full-duplex capability; and receive a first message sent by the user equipment, where the first message is used for indicating that the user equipment can receive uplink data and downlink data on a carrier.

According to a fifth aspect, user equipment is provided, including: a transceiver, configured to receive first information sent by a base station; and a processor, configured to: in a case in which the user equipment is capable of transmitting uplink data and downlink data on a carrier, determine, according to the first information, a carrier used for transmitting first-type information, where the transceiver is further configured to transmit the first-type information on the determined carrier, where the first-type information includes at least one of the following: uplink data, downlink data, and scheduling information.

In a first possible implementation manner of the fifth aspect, the processor is configured to determine, in the following manner according to the first information, the carrier used for transmitting the first-type information: determining, by the processor according to a correspondence between the first information and the carrier used for transmitting the first-type information, the carrier used for transmitting the first-type information.

With reference to the foregoing possible implementation manner, in a second possible implementation manner of the fifth aspect, the processor is configured to determine, in the following manner according to the correspondence between the first information and the carrier used for transmitting the first-type information, the carrier used for transmitting the first-type information: determining, by the processor, whether the first information belongs to a first predetermined set or a second predetermined set; and in a case in which it is determined that the first information belongs to the first predetermined set, determining, by the processor, to transmit the first-type information on a first carrier; or in a case in which it is determined that the first information belongs to the second predetermined set, determining, by the processor, to transmit the first-type information on a second carrier.

With reference to either of the foregoing possible implementation manners, in a third possible implementation manner of the fifth aspect, the processor is configured to determine, in the following manner according to the correspondence between the first information and the carrier used for transmitting the first-type information, the carrier used for transmitting the first-type information: determining, by the processor according to the first information, a subframe pattern corresponding to the first information; and determining, by the processor according to the subframe pattern, a carrier on which the first-type information is transmitted in each subframe.

With reference to any one of the foregoing possible implementation manners, in a fourth possible implementation manner of the fifth aspect, the first information includes the subframe pattern.

With reference to any one of the foregoing possible implementation manners, in a fifth possible implementation manner of the fifth aspect, the first information includes one of the following: a predetermined value and user equipment-specific information.

With reference to any one of the foregoing possible implementation manners, in a sixth possible implementation manner of the fifth aspect, the user equipment-specific information includes one of the following: a cell radio network temporary identifier C-RNTI and a temporary cell radio network temporary identifier TC-RNTI that correspond to the user equipment.

With reference to any one of the foregoing possible implementation manners, in a seventh possible implementation manner of the fifth aspect, the processor is configured to determine, in the following manner according to the correspondence between the first information and the carrier used for transmitting the first-type information, the carrier used for transmitting the first-type information: the first information being corresponding to at least one of the following: a subframe pattern of a first carrier and a subframe pattern of a second carrier; and determining, by the processor according to the subframe pattern of the first carrier and/or the subframe pattern of the second carrier, a carrier on which the first-type information is transmitted in each subframe.

With reference to any one of the foregoing possible implementation manners, in an eighth possible implementation manner of the fifth aspect, the transceiver is configured to transmit the first-type information on the determined carrier in the following manner: receiving, by the transceiver, downlink control information DCI on the determined carrier; and the processor is further configured to: after the transceiver receives the DCI on the determined carrier, determine, according to the DCI, a carrier used for transmitting second-type information, where the second-type information includes: uplink data and/or downlink data.

With reference to any one of the foregoing possible implementation manners, in a ninth possible implementation manner of the fifth aspect, the processor is configured to determine, in the following manner according to the DCI, the carrier used for transmitting the second-type information: the DCI including: first indication information used for indicating that uplink transmission or downlink transmission is to be performed, and second indication information used for indicating a carrier, and determining, by the processor according to the first indication information and the second indication information, the carrier used for transmitting the second-type information.

With reference to any one of the foregoing possible implementation manners, in a tenth possible implementation manner of the fifth aspect, the processor is configured to determine, in the following manner according to the DCI, the carrier used for transmitting the second-type information: descrambling, by the processor, the DCI by using descrambling information in a descrambling information set; and in a case in which the DCI is successfully descrambled by using first descrambling information, determining, by the processor, to transmit the second-type information on the first carrier; or in a case in which the DCI is successfully descrambled by using second descrambling information, determining, by the processor, to transmit the second-type information on the second carrier.

With reference to any one of the foregoing possible implementation manners, in an eleventh possible implementation manner of the fifth aspect, the descrambling information set includes: at least two predetermined sequences or at least two different C-RNTIs.

With reference to any one of the foregoing possible implementation manners, in a twelfth possible implementation manner of the fifth aspect, the transceiver is further configured to: in a case in which the descrambling information set includes at least two different C-RNTIs, before the DCI is descrambled, receive the at least two different C-RNTIs allocated by the base station.

With reference to any one of the foregoing possible implementation manners, in a thirteenth possible implementation manner of the fifth aspect, the processor is configured to determine, in the following manner according to the DCI, the carrier used for transmitting the second-type information: determining, by the processor according to a correspondence between a number of a CCE in which the DCI is located and the carrier used for transmitting the second-type information, the carrier used for transmitting the second-type information.

With reference to any one of the foregoing possible implementation manners, in a fourteenth possible implementation manner of the fifth aspect, the processor is configured to determine, in the following manner according to the correspondence between the number of the CCE in which the DCI is located and the carrier used for transmitting the second-type information, the carrier used for transmitting the second-type information: in a case in which the number of the CCE in which the DCI is located belongs to a first number set, determining, by the processor, to transmit the second-type information on the first carrier; or in a case in which the number of the CCE in which the DCI is located belongs to a second number set, determining, by the processor, to transmit the second-type information on the second carrier.

With reference to any one of the foregoing possible implementation manners, in a fifteenth possible implementation manner of the fifth aspect, the transceiver is further configured to: before the user equipment receives the first information sent by the base station, receive a message that is sent by the base station and that is used for indicating that the base station has a full-duplex capability; and send a first message to the base station, where the first message is used for indicating that the user equipment can receive uplink data and downlink data on a carrier.

According to a sixth aspect, a base station is provided, including: a processor, configured to: in a case in which user equipment is capable of transmitting uplink data and downlink data on a carrier, determine a carrier used for transmitting first-type information by the user equipment, where the first-type information includes at least one of the following: uplink data, downlink data, and scheduling information; and a transceiver, configured to send first information to the user equipment, where there is a correspondence between the first information and the carrier used for transmitting the first-type information, where the transceiver is further configured to transmit the first-type information on the carrier.

In a first possible implementation manner of the sixth aspect, that there is a correspondence between the first information and the carrier used for transmitting the first-type information includes that: if the first information belongs to a first predetermined set, the carrier used for transmitting the first-type information is a first carrier; or if the first information belongs to a second predetermined set, the carrier used for transmitting the first-type information is a second carrier.

With reference to the foregoing possible implementation manner, in a second possible implementation manner of the sixth aspect, that there is a correspondence between the first information and the carrier used for transmitting the first-type information includes that: the first information corresponds to a subframe pattern; and the subframe pattern corresponds to a carrier on which the first-type information is transmitted in a subframe.

With reference to either of the foregoing possible implementation manners, in a third possible implementation manner of the sixth aspect, the first information includes the subframe pattern.

With reference to any one of the foregoing possible implementation manners, in a fourth possible implementation manner of the sixth aspect, the first information includes one of the following: a predetermined value and user equipment-specific information.

With reference to any one of the foregoing possible implementation manners, in a fifth possible implementation manner of the sixth aspect, the user equipment-specific information includes one of the following: a cell radio network temporary identifier C-RNTI and a temporary cell radio network temporary identifier TC-RNTI that correspond to the user equipment.

With reference to any one of the foregoing possible implementation manners, in a sixth possible implementation manner of the sixth aspect, that there is a correspondence between the first information and the carrier used for transmitting the first-type information includes that: the first information corresponds to at least one of the following: a subframe pattern of a first carrier and a subframe pattern of a second carrier; and the subframe pattern of the first carrier and/or the subframe pattern of the second carrier corresponds to a carrier on which the first-type information is transmitted in a subframe.

With reference to any one of the foregoing possible implementation manners, in a seventh possible implementation manner of the sixth aspect, the transceiver is configured to transmit the first-type information on the carrier in the following manner: sending downlink control information DCI to the user equipment on the carrier determined by the base station and used for transmitting the first-type information, where the DCI is used by the user equipment to determine, according to the DCI, a carrier used for transmitting second-type information, and the second-type information includes: uplink data and/or downlink data.

With reference to any one of the foregoing possible implementation manners, in an eighth possible implementation manner of the sixth aspect, the DCI includes: first indication information used for indicating that uplink transmission or downlink transmission is to be performed, and second indication information used for indicating a carrier.

With reference to any one of the foregoing possible implementation manners, in a ninth possible implementation manner of the sixth aspect, the processor is further configured to: before the transceiver sends the downlink control information DCI to the user equipment, scramble the DCI by using scrambling information in a scrambling information set, where if the scrambling information is first scrambling information, the carrier used for transmitting the second-type information is a first carrier; or if the scrambling information is second scrambling information, the carrier used for transmitting the second-type information is a second carrier.

With reference to any one of the foregoing possible implementation manners, in a tenth possible implementation manner of the sixth aspect, the scrambling information set includes: at least two predetermined sequences or at least two different C-RNTIs.

With reference to any one of the foregoing possible implementation manners, in an eleventh possible implementation manner of the sixth aspect, if the scrambling information set includes at least two different C-RNTIs, the transceiver is further configured to send the at least two different C-RNTIs to the user equipment.

With reference to any one of the foregoing possible implementation manners, in a twelfth possible implementation manner of the sixth aspect, there is a correspondence between a number of a CCE in which the DCI is located and the carrier used for transmitting the second-type information.

With reference to any one of the foregoing possible implementation manners, in a thirteenth possible implementation manner of the sixth aspect, that there is a correspondence between a number of a CCE in which the DCI is located and the carrier used for transmitting the second-type information includes that: if the number of the CCE in which the DCI is located belongs to a first number set, the carrier used for transmitting the second-type information is a first carrier; or if the number of the CCE in which the DCI is located belongs to a second number set, the carrier used for transmitting the second-type information is a second carrier.

With reference to any one of the foregoing possible implementation manners, in a fourteenth possible implementation manner of the sixth aspect, the transceiver is further configured to: before sending the first information to the user equipment, send, to the user equipment, a message used for indicating that the base station has a full-duplex capability; and receive a first message sent by the user equipment, where the first message is used for indicating that the user equipment can receive uplink data and downlink data on a carrier.

By using the embodiments of the present invention, if UE has a duplex capability, the UE determines, according to a first message sent by a base station, a carrier to be used, and therefore, can effectively receive or send information.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention. It should be noted that, in case of no contradiction, the embodiments of the present invention and features in the embodiments may be combined with each other.

A base station described in the embodiments of the present invention may include an evolved Node B (eNB for short), an access point, a relay station, and another device that may be used for access.

In the embodiments of the present invention, a frequency band is symmetrical, and the base station (for example, the eNB) is full-duplex. UE in the embodiments of the present invention includes Type II UE, which may send uplink data or receive downlink data on an uplink carrier, and may receive downlink data or send uplink data on a downlink carrier, but cannot receive and send data simultaneously on an uplink carrier (or a downlink carrier); and Type III UE, which is a full-duplex UE, that is, UE that may receive and send data simultaneously on an uplink carrier (or a downlink carrier). The foregoing two UEs have a duplex capability.

The UE in the embodiments of the present invention can flexibly use a spectrum, and therefore, can improve a spectrum utilization rate.

Figure 1:
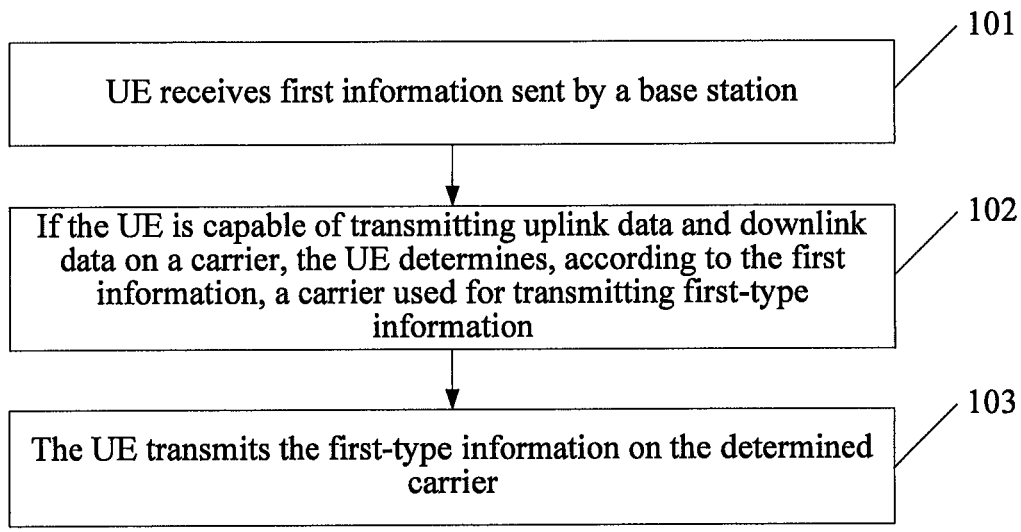
FIG. 1 is a flowchart of a carrier indication method according to an embodiment of the present invention.

An embodiment of the present invention provides a carrier indication method, where the method may be used to indicate a carrier that is to be used by UE having a duplex capability. As shown in FIG. 1, the method includes the following steps:

Step 101: UE receives first information sent by a base station.

Step 102: If the UE is capable of transmitting uplink data and downlink data on a carrier, the UE determines, according to the first information, a carrier used for transmitting first-type information.

Step 103: The UE transmits the first-type information on the determined carrier, where the first-type information includes at least one of the following: uplink data, downlink data, and scheduling information.

In a related technology, if UE has a duplex capability, that is, the UE is capable of transmitting uplink data and downlink data on a carrier, the UE needs to learn on which carrier the UE is to transmit information; otherwise, the UE cannot normally transmit information. In this embodiment, the UE determines, according to the first information sent by the base station, the carrier used for transmitting information, and therefore, can normally transmit information.

Preferably, the determining, by the UE according to the first information, a carrier used for transmitting first-type information may include: determining, by the UE according to a correspondence between the first information and the carrier used for transmitting the first-type information, the carrier used for transmitting the first-type information. The correspondence may be a one-to-one correspondence, may be a one-to-many correspondence, may be a many-to-one correspondence, or may be a many-to-many correspondence. The correspondence may be implemented by using a correspondence table, or may be implemented by using a correspondence expression or in another manner.

Figure 2:
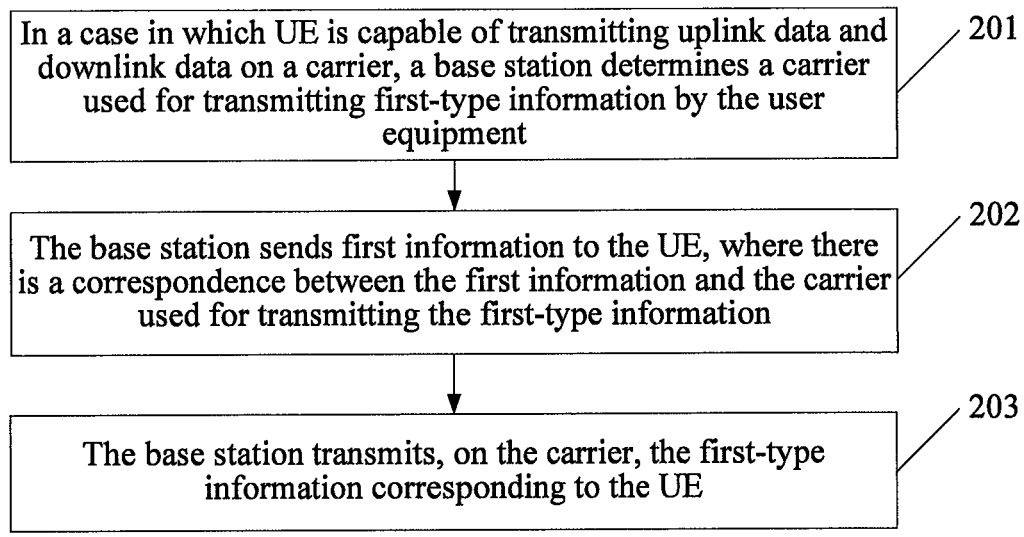
FIG. 2 is a flowchart of another carrier indication method according to an embodiment of the present invention.

An embodiment of the present invention provides a carrier indication method, where the method may be used to indicate a carrier that is to be used by UE having a duplex capability. As shown in FIG. 2, the method includes the following steps:

Step 201: In a case in which UE is capable of transmitting uplink data and downlink data on a carrier, a base station determines a carrier used for transmitting first-type information by the user equipment, where the first-type information includes at least one of the following: uplink data, downlink data, and scheduling information.

Step 202: The base station sends first information to the UE, where there is a correspondence between the first information and the carrier used for transmitting the first-type information, so that in the case in which the UE is capable of transmitting uplink data and downlink data on a carrier, the UE determines, according to the first information, the carrier used for transmitting the first-type information.

Step 203: The base station transmits, on the carrier, the first-type information corresponding to the UE, where the first-type information includes at least one of the following: uplink data, downlink data, and scheduling information.

In a related technology, if UE has a duplex capability, that is, the UE is capable of transmitting uplink data and downlink data on a carrier, the UE needs to learn on which carrier the UE is to transmit information; otherwise, the UE cannot normally transmit information. In this embodiment, the UE determines, according to the first information sent by the base station, the carrier used for transmitting information, and therefore, can normally transmit information.

Preferably, before step 202, the base station generates the first information according to the correspondence between the first information and the carrier used for transmitting the first-type information. The correspondence may be a one-to-one correspondence, may be a one-to-many correspondence, may be a many-to-one correspondence, or may be a many-to-many correspondence. The correspondence may be implemented by using a correspondence table, or may be implemented by using a correspondence expression or in another manner.

Figure 3:
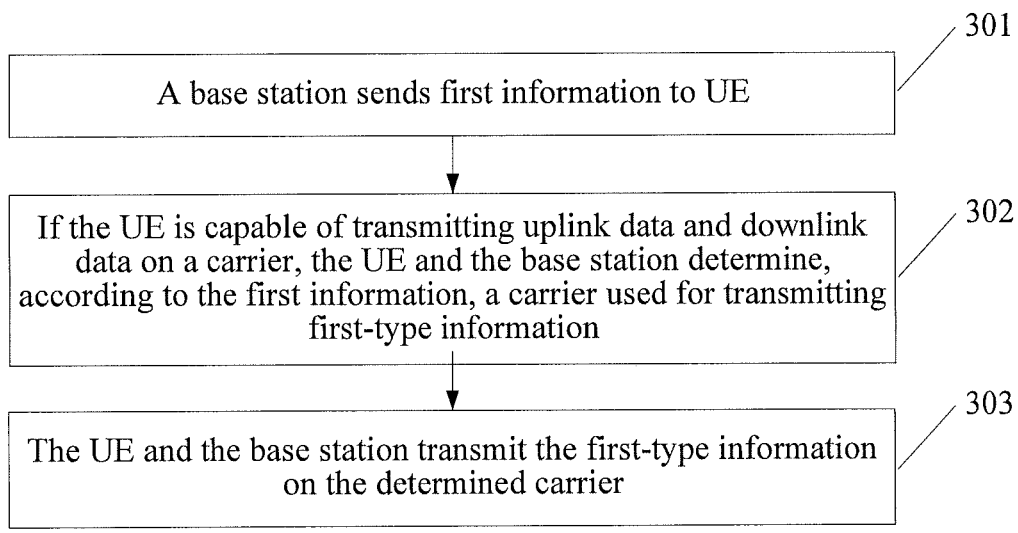
FIG. 3 is a flowchart of still another carrier indication method according to an embodiment of the present invention.

An embodiment of the present invention provides a carrier indication method, where the method may be used to indicate a carrier that is to be used by UE having a duplex capability. As shown in FIG. 3, the method includes the following steps:

Step 301: A base station sends first information to UE.

Step 302: If the UE is capable of transmitting uplink data and downlink data on a carrier, the UE and the base station determine, according to the first information, a carrier used for transmitting first-type information.

Step 303: The UE and the base station transmit the first-type information on the determined carrier, where the first-type information includes at least one of the following: uplink data, downlink data, and scheduling information.

In a related technology, if UE has a duplex capability, that is, the UE is capable of transmitting uplink data and downlink data on a carrier, the UE needs to learn on which carrier the UE is to transmit information; otherwise, the UE cannot normally transmit information. In this embodiment, the UE determines, according to the first information sent by the base station, the carrier used for transmitting information, and therefore, can normally transmit information.

Preferably, before step 301, in a case in which the UE is capable of transmitting uplink data and downlink data on a carrier, the base station determines the carrier used for transmitting the first-type information by the user equipment, where the first-type information includes at least one of the following: uplink data, downlink data, and scheduling information.

Preferably, the determining, by the UE according to the first information, a carrier used for transmitting first-type information may include: determining, by the UE according to a correspondence between the first information and the carrier used for transmitting the first-type information, the carrier used for transmitting the first-type information. The correspondence may be a one-to-one correspondence, may be a one-to-many correspondence, may be a many-to-one correspondence, or may be a many-to-many correspondence. The correspondence may be implemented by using a correspondence table, or may be implemented by using a correspondence expression or in another manner.

In an exemplary implementation manner of this embodiment of the present invention, the determining, by the UE according to a correspondence between the first information and the carrier used for transmitting the first-type information, the carrier used for transmitting the first-type information may include: determining, by the UE, whether the first information belongs to a first predetermined set or a second predetermined set; if the first information belongs to the first predetermined set, determining, by the UE, to transmit the first-type information on a first carrier; or if the first information belongs to a second set, determining, by the UE, to transmit the first-type information on a second carrier. The first carrier and the second carrier each may include multiple carriers. In this embodiment, the first predetermined set may be a numerical value, may be a numerical value range, or may be a set of some numerical values. By using this embodiment, a carrier to be used by the UE can be determined provided that a relationship between the first information and a predetermined set is determined.

In another exemplary implementation manner of this embodiment of the present invention, the determining, by the UE according to a correspondence between the first information and the carrier used for transmitting the first-type information, the carrier used for transmitting the first-type information includes: determining, by the UE, a corresponding subframe pattern according to the first information; and determining, by the UE according to the subframe pattern, a carrier on which the first-type information is transmitted in each subframe. Preferably, the subframe pattern may be included in the first information. The subframe pattern may be a proportion, representing a proportion of a subframe used for transmitting information of a same type (for example, at least one of uplink data, downlink data, and scheduling information) on each of different carriers. By using this embodiment, a carrier to be used by the UE can be determined according to a subframe pattern only.

Optionally, the first information includes one of the following: a predetermined value and UE-specific information. Preferably, the UE-specific information includes one of the following: a cell radio network temporary identifier (C-RNTI for short) and a temporary cell radio network temporary identifier (TC-RNTI for short) that correspond to the UE. This embodiment has an advantage of simple implementation.

In still another exemplary implementation manner of this embodiment of the present invention, the determining, by the UE according to a correspondence between the first information and the carrier used for transmitting the first-type information, the carrier used for transmitting the first-type information includes: the first information being corresponding to at least one of the following: a subframe pattern of a first carrier and a subframe pattern of a second carrier; and determining, by the UE according to the subframe pattern of the first carrier and/or the subframe pattern of the second carrier, a carrier on which the first-type information is transmitted in each subframe. By using this embodiment, a carrier to be used by the UE can be determined according to a subframe pattern of each carrier only.

Preferably, the transmitting, by the UE, the first-type information on the determined carrier includes: transmitting downlink control information (DCI for short) on the determined carrier, for example, the base station sends the DCI to the UE on the determined carrier, and/or, the UE receives the DCI on the determined carrier; and determining, according to the DCI, a carrier used for transmitting second-type information, where the second-type information includes: uplink data and/or downlink data. In this embodiment, a carrier used for transmitting scheduling information (for example, DCI) is determined according to the foregoing determining method, and a carrier used for transmitting uplink data and/or downlink data is determined according to the transmitted DCI, thereby determining the carrier to be used by the UE.

Optionally, the determining, by the UE according to the DCI, a carrier used for transmitting second-type information may be implemented in the following manner: the DCI including: first indication information used for indicating that uplink transmission or downlink transmission is to be performed and second indication information used for indicating a carrier, and determining, by the UE according to the first indication information and the second indication information, the carrier used for transmitting the second-type information. In this embodiment, the DCI is extended, so that the DCI includes the second indication information used for indicating the carrier; therefore, the UE can conveniently determine, according to the second indication information, the carrier used for transmitting the second-type information. Preferably, the determining, by the UE according to the first indication information and the second indication information, the carrier used for transmitting the second-type information includes: if the first indication information indicates that uplink transmission is to be performed, transmitting, by the UE, uplink data on the carrier indicated by the second indication information; or if the first indication information indicates that downlink transmission is to be performed, transmitting, by the UE, downlink data on the carrier indicated by the second indication information.

Preferably, the determining, by the UE according to the DCI, a carrier used for transmitting second-type information may further be implemented in the following manner: descrambling the DCI by using descrambling information in a descrambling information set; and if the DCI is successfully descrambled by using first descrambling information, determining to transmit the second-type information on the first carrier; or if the DCI is successfully descrambled by using second descrambling information, determining to transmit the second-type information on the second carrier. Preferably, the descrambling information set may include: at least two predetermined sequences or at least two different C-RNTIs. The descrambling information in the descrambling information set is at least two predetermined sequences or at least two different C-RNTIs. The descrambling information is information used for descrambling the DCI. In this embodiment, the descrambling information of the DCI is associated with a carrier to be used by the UE, so that the carrier to be used by the UE can be determined without changing specific content of the DCI or changing an existing procedure. Accordingly, before the UE determines, according to the DCI, the carrier used for transmitting the second-type information, on a base station side, the base station scrambles the DCI by using scrambling information in a scrambling information set, where there is a correspondence between the scrambling information and the carrier used for transmitting the second-type information, for example, if the scrambling information is first scrambling information, the second-type information is transmitted on a first carrier; or if the scrambling information is second scrambling information, the second-type information is transmitted on a second carrier. The first scrambling information corresponds to the first descrambling information, and the second scrambling information corresponds to the second descrambling information.

Preferably, if the descrambling information set and/or the scrambling information set includes at least two different C-RNTIs, before the DCI is descrambled, the base station allocates at least two different C-RNTIs to the UE, and sends the at least two different C-RNTIs to the UE.

Optionally, the determining, according to the DCI, a carrier used for transmitting the second-type information may further be implemented in the following manner: determining, according to a correspondence between a number of a CCE in which the DCI is located and the carrier used for transmitting the second-type information, the carrier used for transmitting the second-type information. The correspondence may be a one-to-one correspondence, may be a one-to-many correspondence, may be a many-to-one correspondence, or may be a many-to-many correspondence. The correspondence may be implemented by using a correspondence table, or may be implemented by using a correspondence expression or in another manner.

Optionally, the determining, according to a correspondence between a number of a CCE in which the DCI is located and the carrier used for transmitting the second-type information, the carrier used for transmitting the second-type information includes: if the number of the CCE in which the DCI is located belongs to a first number set, determining to transmit the second-type information on the first carrier; or if the number of the CCE in which the DCI is located belongs to a second number set, determining to transmit the second-type information on the second carrier.

Preferably, before the sending, by a base station, first information to UE, the method further includes:

Step 304: The base station sends, to the UE, a message used for indicating that the base station has a full-duplex capability.

Step 305: The UE sends a first message to the base station, where the first message is used for indicating that the UE can receive uplink data and downlink data on a carrier. By using this embodiment, the base station can determine that the UE has a duplex capability.

Embodiment 1

This embodiment provides a carrier indication method, where the method may be used to indicate a carrier that is to be used by UE having a duplex capability. The method includes the following steps:

Step 1: An eNB notifies, by using higher layer signaling, UE that the eNB has a full-duplex capability.

Step 2: After accessing the eNB randomly and learning that the eNB has a full-duplex capability, the UE notifies the eNB that the UE has a duplex capability, for example, notifies the eNB that the UE is Type II UE or Type III UE.

Step 3: The eNB sends, to the UE, information indicating which carrier is to be used by the UE. The indication method may include any one of the following:

Manner 1: The eNB indicates, to the UE by using higher layer signaling, on which carrier the UE should receive scheduling information, receive downlink data, and/or send uplink data. The following gives exemplary description.

Example 1: When the eNB sends "1", it represents that the scheduling information is received on a carrier N, and when the eNB sends "0", it represents that the scheduling information is received on a carrier M; therefore, after receiving "1", the UE may receive the scheduling information on the carrier N; otherwise, the UE receives the scheduling information on the carrier M. On which carrier the UE is scheduled to send uplink data or receive downlink data is not limited, for example, it may be specified that downlink data is received on a carrier on which the scheduling information is received, and uplink data is sent on another carrier.

Example 2: When the eNB sends "1", it may represent that downlink data is received on a carrier N, and when the eNB sends "0", it represents that downlink data is received on a carrier M; in this case, on which carrier the UE receives the scheduling information and on which carrier new UE is scheduled to send uplink data are not limited, for example, it may be specified that the scheduling information is received on the carrier M, "1" may not only represent that the downlink data is received on the carrier N, but also represent that the uplink data is sent on the carrier M, and "0" may not only represent that the downlink data is received on the carrier M, but also represent that the uplink data is sent on the carrier N.

Example 3: When the eNB sends "1", it may represent that uplink data is sent on a carrier M, and when the eNB sends "0", it represents that uplink data is sent on a carrier N; in this case, on which carrier the UE receives the scheduling information and the downlink data is not limited, for example, "1" may not only represent that the uplink data is sent on the carrier M, but also represent that the scheduling information and the downlink data are received on the carrier N, and "0" may not only represent that the uplink data is sent on the carrier N, but also represent that the scheduling information and the downlink data are received on the carrier M.

It should be noted that, the foregoing example is only exemplary description of this embodiment of the present invention, and in a practical application, explanations of "1" and "0" may change.

Manner 2: Indicate, to the UE by using an implicit method, on which carrier the UE should receive scheduling information, receive downlink data, and/or send uplink data. For example, a carrier to be used by the UE may be found through mapping by using a C-RNTI or a TC-RNTI. If the C-RNTI or the TC-RNTI is a value (for example, an even number, or greater than/less than a value), the UE receives the scheduling information on a carrier N; otherwise, the UE receives the scheduling information on a carrier M. In this case, the UE may determine, according to its own C-RNTI or TC-RNTI, on which carrier the UE is to receive the scheduling information, receive the downlink data, and/or send the uplink data. When the C-RNTI or the TC-RNTI is used to find, through mapping, a carrier to be used by the UE, an execution sequence of step 3 and step 2 is not limited, for example, step 3 may be executed first, and then step 2 is executed.

Figure 4:
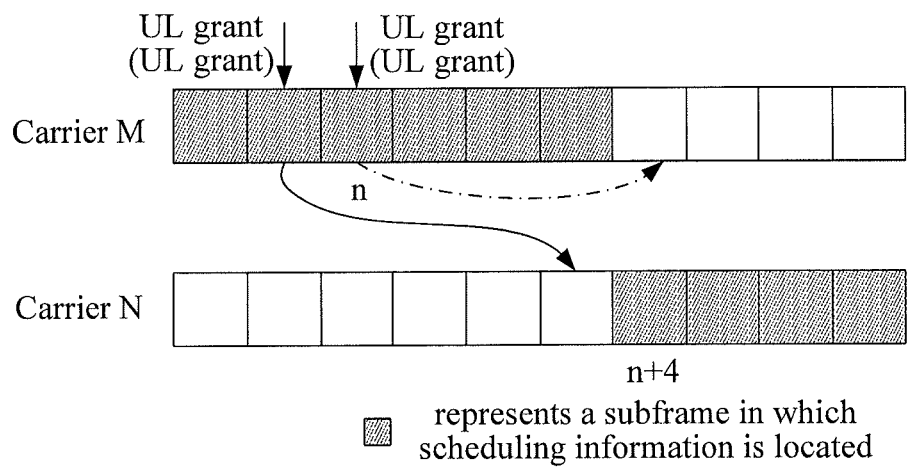
FIG. 4 is a schematic diagram of a subframe pattern according to an embodiment of the present invention.

Manner 3: The eNB sends a subframe pattern (pattern) to the UE, where the subframe pattern is used for notifying the UE of a pattern to receive the scheduling information, receive the downlink data, and/or send the uplink data, and the UE receives the scheduling information, receives the scheduling information and the downlink data, and/or sends the uplink data on a carrier specified by the subframe pattern. The following describes Manner 3 by using an example. The eNB notifies the UE that the subframe pattern is 6:4, where this subframe pattern may represent a subframe pattern shown in FIG. 4, that is, in a radio frame, for the first six subframes, the scheduling information is received on the carrier M, and for the last four subframes, the scheduling information is received on the carrier N. It should be noted that, the subframe pattern is UE specific, and in a cell, subframe patterns of different UEs may be different. For UE supporting carrier aggregation, blank subframes in FIG. 4 may also be used to schedule downlink data, for example, in a subframe n, the UE may also be scheduled to receive the downlink data on the carrier N. If a capability of non-full-duplex UE (type II UE) is that the UE can only receive downlink scheduling information and downlink data on one carrier, and send uplink data on another carrier, in FIG. 4, when the UE receives an uplink grant (UL grant) in the subframe n, the UE may send the uplink data on the carrier N in a subframe (n+4). However, according to the pattern shown in FIG. 4, the subframe (n+4) on the carrier N needs to be used for receiving downlink scheduling information, and because the non-full-duplex UE cannot send and receive data in a same subframe on a same carrier simultaneously, a method may be specified, where for the subframe n to a subframe (n+3), after receiving the UL grant, the UE sends the uplink data always on the carrier M, thereby avoiding that new non-full-duplex UE performs sending and receiving simultaneously. For a non-full-duplex UE, when the non-full-duplex UE switches from a carrier used for receiving downlink scheduling information to another carrier to receive downlink scheduling information, a switching time may be needed, and this factor may be considered during system design, for example, in the subframe (n+3) in FIG. 4, the eNB may avoid scheduling downlink data for the UE.

Manner 4: For new UE supporting carrier aggregation, the eNB may also notify a subframe pattern (for example, a subframe ratio) for each carrier, where the subframe pattern represents in which subframes on each carrier, scheduling information is to be received, downlink data is to be received, and/or uplink data is to be sent. The subframe pattern is UE specific, and in a cell, subframe patterns of different UEs may be different. The following describes Manner 4 by using an example.

Figure 5:
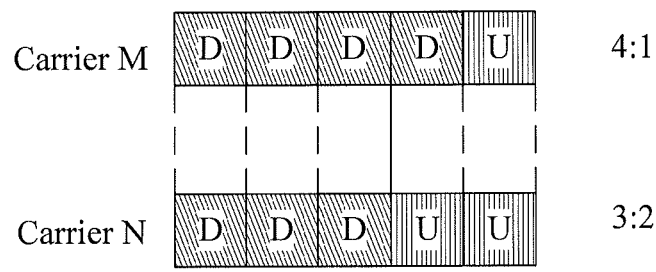
FIG. 5 is a schematic diagram of another subframe pattern according to an embodiment of the present invention.

In FIG. 5, D represents downlink, and U represents uplink. The eNB notifies the UE of subframe ratios on two carriers. For the carrier M, the notified subframe ratio is 4:1, and for the carrier N, the notified subframe ratio is 3:2, where the subframe ratios represent that: in five subframes, in the first three subframes, the two carriers both are used for receiving downlink scheduling information and downlink data, in the fourth subframe, the carrier M is used for receiving downlink scheduling information and downlink data, and the carrier N is used for sending uplink data; in the fifth subframe, the two carriers both are used for sending uplink data.

It should be noted that, this embodiment uses only two carriers as an example for description, but is not limited to a case in which there are two carriers. The method in this embodiment may also be extended to a case in which there are more than two carriers.

Embodiment 2

This embodiment of the present invention further provides a carrier indication method, where the method may be used to indicate a carrier that is to be used by UE having a duplex capability.

When an eNB schedules UE having a duplex capability, because the UE is capable of transmitting uplink data and downlink data on a carrier, during scheduling, on which carrier the UE is scheduled to send and/or receive data needs to be indicated to the UE. The following introduces a method for indicating, to the UE during scheduling of the UE, on which carrier transmission is to be performed.

An indication field indication is added to DCI, for example, if the DCI is a DL grant, when the indication field is "1", it represents that the UE receives downlink data on a carrier N, or when the indication field is "0", it represents that the UE receives downlink data on a carrier M; if the DCI is an UL grant, when the indication field is "1", it represents that the UE sends uplink data on a carrier M, or when the indication field is "0", it represents that the UE receives downlink data on a carrier N. A resource allocation field in the DCI may also be extended by one bit, and all resource blocks (RB for short) of two carriers are allocated together, for example, each of the two carriers has 100 RBs, the two carriers have 200 RBs in total, and the 200 RBs are put together for allocation and are numbered from 0 to 199.

A cyclic redundancy check (CRC for short) of DCI of a scheduled UE is scrambled by using different sequences, where different scrambling sequences represent that information is sent/received on different carriers. For example, scrambling performed by using a sequence {a} represents that information is sent and/or received on a carrier M, and scrambling performed by using a sequence {b} represents that information is sent and/or received on a carrier N. When receiving the scrambled CRC of the DCI, the UE can determine, by determining a scrambling sequence, on which carrier information should be sent and/or received.

A base station allocates at least two C-RNTIs to the UE, where different C-RNTIs represent that scheduling is performed on different carriers. To ensure that a quantity of times of blind detection by the UE is not increased, same search space may be shared for the different C-RNTIs. For example, two C-RNTIs are allocated to the UE, if the CRC, sent by the eNB to the UE, of the DCI used to perform uplink scheduling is scrambled by using a first C-RNTI, it represents that the UE is to send the uplink data on the carrier M; if the CRC, sent by the eNB to the UE, of the DCI used to perform uplink scheduling is scrambled by using a second C-RNTI, it represents that the UE is to send the uplink data on the carrier N.

A control channel element (CCE for short) of a physical downlink control channel (PDCCH for short) of a scheduled UE corresponds to different scheduling carriers. For example, if a number of a first CCE of the PDCCH of the scheduled UE is less than a half of a total quantity of CCEs, it represents that scheduling is performed on the carrier M; otherwise, scheduling is performed on the carrier N.

It should be noted that, this embodiment uses only two carriers as an example for description, but is not limited to a case in which there are two carriers. The method in this embodiment may also be extended to a case in which there are more than two carriers.

Embodiment 1 and Embodiment 2 may be combined and used. For example, a subframe pattern in Embodiment 1 is allocated to UE, so that the UE can use a corresponding carrier according to the subframe pattern to receive scheduling information, and then, data is scheduled on different carriers by using the method in Embodiment 2.

Figure 6:
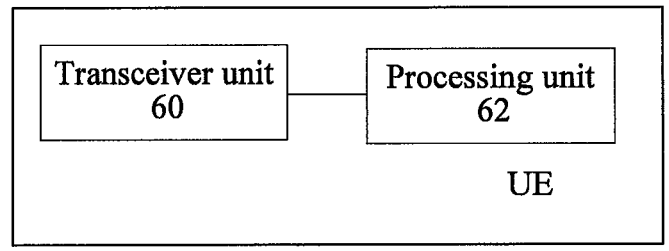
FIG. 6 is a structural block diagram of user equipment according to an embodiment of the present invention.

An embodiment of the present invention provides user equipment, where the user equipment may implement the foregoing method embodiment. Therefore, a feature of the user equipment in the foregoing method embodiment may be combined with this embodiment. FIG. 6 is a structural block diagram of the user equipment according to this embodiment of the present invention. As shown in FIG. 6, the user equipment includes: a transceiver unit 60 and a processing unit 62, where the transceiver unit 60 is configured to receive first information sent by a base station; the processing unit 62 is configured to: in a case in which the user equipment is capable of transmitting uplink data and downlink data on a carrier, determine, according to the first information, a carrier used for transmitting first-type information; and the transceiver unit 60 is further configured to transmit the first-type information on the determined carrier, where the first-type information includes at least one of the following: uplink data, downlink data, and scheduling information.

Preferably, the processing unit 62 is configured to determine, in the following manner according to the first information, the carrier used for transmitting the first-type information: determining, by the processing unit 62 according to a correspondence between the first information and the carrier used for transmitting the first-type information, the carrier used for transmitting the first-type information.

Optionally, the processing unit 62 is configured to determine, in the following manner according to the correspondence between the first information and the carrier used for transmitting the first-type information, the carrier used for transmitting the first-type information: determining, by the processing unit 62, whether the first information belongs to a first predetermined set or a second predetermined set; in a case in which it is determined that the first information belongs to the first predetermined set, determining, by the processing unit 62, to transmit the first-type information on a first carrier; or in a case in which it is determined that the first information belongs to the second predetermined set, determining, by the processing unit 62, to transmit the first-type information on a second carrier.

In an exemplary implementation manner of this embodiment of the present invention, the processing unit 62 is configured to determine, in the following manner according to the correspondence between the first information and the carrier used for transmitting the first-type information, the carrier used for transmitting the first-type information: determining, by the processing unit 62 according to the first information, a subframe pattern corresponding to the first information; and determining, by the processing unit 62 according to the subframe pattern, a carrier on which the first-type information is transmitted in each subframe.

Optionally, the first information includes the subframe pattern.

Preferably, the first information includes at least one of the following: a predetermined value and user equipment-specific information.

Optionally, the user equipment-specific information includes at least one of the following: a C-RNTI and a TC-RNTI.

Optionally, the processing unit 62 is configured to determine, in the following manner according to the correspondence between the first information and the carrier used for transmitting the first-type information, the carrier used for transmitting the first-type information: the first information being corresponding to at least one of the following: a subframe pattern of a first carrier and a subframe pattern of a second carrier; and determining, by the processing unit 62 according to the subframe pattern of the first carrier and/or the subframe pattern of the second carrier, a carrier on which the first-type information is transmitted in each subframe.

Preferably, the transceiver unit 60 is configured to transmit the first-type information on the determined carrier in the following manner: receiving, by the transceiver unit 60, downlink control information DCI on the determined carrier; and the processing unit 62 is further configured to: after the transceiver unit 60 receives the DCI on the determined carrier, determine, according to the DCI, a carrier used for transmitting second-type information, where the second-type information includes: uplink data and/or downlink data.

In another exemplary implementation manner of this embodiment of the present invention, the processing unit 62 is configured to determine, in the following manner according to the DCI, the carrier used for transmitting the second-type information: the DCI including: first indication information used for indicating that uplink transmission or downlink transmission is to be performed, and second indication information used for indicating a carrier, and determining, by the processing unit 62 according to the first indication information and the second indication information, the carrier used for transmitting the second-type information.

Optionally, the processing unit 62 is configured to determine, in the following manner according to the DCI, the carrier used for transmitting the second-type information: descrambling, by the processing unit 62, the DCI by using descrambling information in a descrambling information set; and in a case in which the DCI is successfully descrambled by using first descrambling information, determining, by the processing unit 62, to transmit the second-type information on the first carrier; or in a case in which the DCI is successfully descrambled by using second descrambling information, determining, by the processing unit 62, to transmit the second-type information on the second carrier.

Preferably, the descrambling information set includes: at least two predetermined sequences or at least two different C-RNTIs.

Optionally, the transceiver unit 60 is further configured to: in a case in which the descrambling information set includes at least two different C-RNTIs, before the DCI is descrambled, receive the at least two different C-RNTIs allocated by the base station.

Preferably, the processing unit 62 is configured to determine, in the following manner according to the DCI, the carrier used for transmitting the second-type information: determining, by the processing unit 62 according to a correspondence between a number of a CCE in which the DCI is located and the carrier used for transmitting the second-type information, the carrier used for transmitting the second-type information.

Optionally, the processing unit 62 is configured to determine, in the following manner according to the correspondence between the number of the CCE in which the DCI is located and the carrier used for transmitting the second-type information, the carrier used for transmitting the second-type information: in a case in which the number of the CCE in which the DCI is located belongs to a first number set, determining, by the processing unit 62, to transmit the second-type information on the first carrier; or in a case in which the number of the CCE in which the DCI is located belongs to a second number set, determining, by the processing unit 62, to transmit the second-type information on the second carrier.

Preferably, the transceiver unit 60 is further configured to: before the user equipment receives the first information sent by the base station, receive a message sent by the base station and used for indicating that the base station has a full-duplex capability, and send a first message to the base station, where the first message is used for indicating that the user equipment can receive uplink data and downlink data on a carrier.

Figure 7:
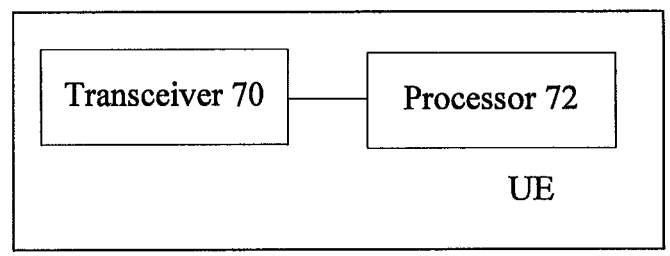
FIG. 7 is a structural block diagram of another user equipment according to an embodiment of the present invention.

An embodiment of the present invention provides another user equipment, where the user equipment may implement the foregoing method embodiment. Therefore, a feature of the user equipment in the foregoing method embodiment may be combined with this embodiment. FIG. 7 is a structural block diagram of the another user equipment according to this embodiment of the present invention. As shown in FIG. 7, the user equipment includes: a transceiver 70 and a processor 72. The transceiver 70 may be configured to implement functions of the transceiver unit 60 in the embodiment shown in FIG. 6, and the processor 72 may be configured to implement functions of the processing unit 62 in the embodiment shown in FIG. 6.

Figure 8:
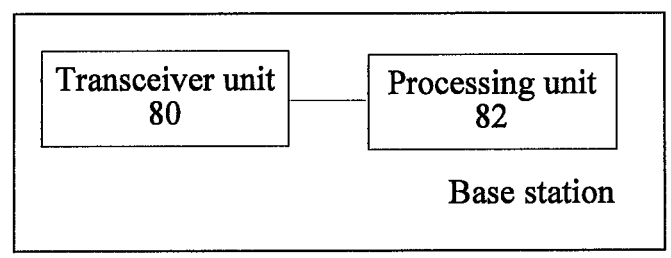
FIG. 8 is a structural block diagram of a base station according to an embodiment of the present invention.

An embodiment of the present invention provides a base station, where the base station may implement the foregoing method embodiment. Therefore, a feature of the base station in the foregoing method embodiment may be combined with this embodiment. FIG. 8 is a structural block diagram of the base station according to this embodiment of the present invention. As shown in FIG. 8, the base station includes: a transceiver unit 80 and a processing unit 82. The processing unit 82 is configured to: in a case in which user equipment is capable of transmitting uplink data and downlink data on a carrier, determine a carrier used for transmitting first-type information by the user equipment, where the first-type information includes at least one of the following: uplink data, downlink data, and scheduling information; the transceiver unit 80 is configured to send first information to the user equipment, where there is a correspondence between the first information and the carrier used for transmitting the first-type information; and the transceiver unit 80 is further configured to transmit the first-type information on the carrier.

Preferably, that there is a correspondence between the first information and the carrier used for transmitting the first-type information includes that: if the first information belongs to a first predetermined set, the carrier used for transmitting the first-type information is a first carrier; or if the first information belongs to a second predetermined set, the carrier used for transmitting the first-type information is a second carrier.

Preferably, that there is a correspondence between the first information and the carrier used for transmitting the first-type information includes that: the first information corresponds to a subframe pattern, and the subframe pattern corresponds to a carrier on which the first-type information is transmitted in a subframe.

Optionally, the first information includes the subframe pattern.

Optionally, the first information includes at least one of the following: a predetermined value and user equipment-specific information.

Preferably, the user equipment-specific information includes at least one of the following: a cell radio network temporary identifier C-RNTI and a temporary cell radio network temporary identifier TC-RNTI that correspond to the user equipment.

Preferably, that there is a correspondence between the first information and the carrier used for transmitting the first-type information includes that: the first information corresponds to at least one of the following: a subframe pattern of a first carrier and a subframe pattern of a second carrier; and the subframe pattern of the first carrier and/or the subframe pattern of the second carrier corresponds to a carrier on which the first-type information is transmitted in the subframe.

Optionally, the transceiver unit 80 is configured to transmit the first-type information on the carrier in the following manner: sending downlink control information DCI to the user equipment on the carrier determined by the base station and used for transmitting the first-type information, where the DCI is used by the user equipment to determine, according to the DCI, a carrier used for transmitting second-type information, and the second-type information includes: uplink data and/or downlink data.

Optionally, the DCI includes: first indication information used for indicating that uplink transmission or downlink transmission is to be performed, and second indication information used for indicating a carrier.

Preferably, the processing unit 82 is further configured to: before the transceiver unit 80 sends the downlink control information DCI to the user equipment, scramble the DCI by using scrambling information in a scrambling information set, where if the scrambling information is first scrambling information, the carrier used for transmitting the second-type information is a first carrier; or if the scrambling information is second scrambling information, the carrier used for transmitting the second-type information is a second carrier.

Preferably, the scrambling information set includes: at least two predetermined sequences or at least two different C-RNTIs.

Optionally, if the scrambling information set includes at least two different C-RNTIs, the transceiver unit 80 is further configured to send the at least two different C-RNTIs to the user equipment.

Preferably, there is a correspondence between a number of a CCE in which the DCI is located and a carrier used for transmitting second-type information.

In an exemplary implementation manner of this embodiment of the present invention, that there is a correspondence between a number of a CCE in which the DCI is located and the carrier used for transmitting the second-type information includes that: if the number of the CCE in which the DCI is located belongs to a first number set, the carrier used for transmitting the second-type information is a first carrier; or if the number of the CCE in which the DCI is located belongs to a second number set, the carrier used for transmitting the second-type information is a second carrier.

In another exemplary implementation manner of this embodiment of the present invention, the transceiver unit 80 is further configured to: before sending the first information to the user equipment, send, to the user equipment, a message used for indicating that the base station has a full-duplex capability; and receive a first message sent by the user equipment, where the first message is used for indicating that the user equipment can receive uplink data and downlink data on a carrier.

Figure 9:
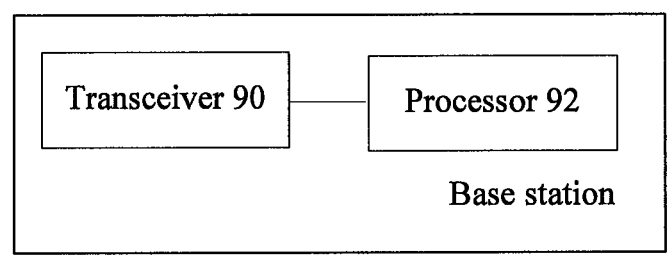
FIG. 9 is a structural block diagram of another base station according to an embodiment of the present invention.

An embodiment of the present invention provides another base station, where the base station may implement the foregoing method embodiment. Therefore, a feature of the base station in the foregoing method embodiment may be combined with this embodiment. FIG. 9 is a structural block diagram of the another base station according to this embodiment of the present invention. As shown in FIG. 9, the base station includes: a transceiver 90 and a processor 92. The transceiver 90 may be configured to implement functions of the transceiver unit 80 in the embodiment shown in FIG. 8, and the processor 92 may be configured to implement functions of the processing unit 82 in the embodiment shown in FIG. 8.

The processor in the foregoing embodiments of the present invention may be a baseband processor, may be an integrated circuit chip having a signal processing capability, or may be a hardware processor such as a central processing unit (CPU for short). In an implementation process, steps of the foregoing method may be implemented by using an integrated logic circuit of hardware of the processor or by using an instruction in a software form. The instructions may be implemented and controlled in a manner of cooperation by using the processor, to perform the method disclosed in the embodiments of the present invention. The processor may be a general purpose processor, a digital signal processor (DSP for short), an application specific integrated circuit (ASIC for short), a field programmable gate array (FPGA for short) or another programmable logic device, a discrete gate or a transistor logic device, or a discrete hardware component, and may implement or execute the methods, steps, and logic block diagrams that are disclosed in the embodiments of the present invention. A general purpose processor may be a microprocessor or the processor may also be any conventional processor, decoder, and the like. Steps of the methods disclosed with reference to the embodiments of the present invention may be directly executed and accomplished by means of a hardware processor, or may be executed and accomplished by using a combination of hardware and software modules in the processor. The software module may be located in a mature storage medium in the field, such as a random access memory, a flash memory, a read-only memory, a programmable read-only memory, an electrically-erasable programmable memory or a register.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. Examples of the computer-readable medium include, but are not limited to: a random access memory (RAM for short), a read-only memory (ROM for short), an electrically erasable programmable read-only memory (EEPROM for short), a compact disc read-only memory (CD-ROM for short) or other optical disc storage, a disk storage medium or another disk storage device, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL for short) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD for short), a laser disc, an optical disc, a digital versatile disc (DVD for short), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A carrier indication method, comprising:
   upon determining that a user equipment is capable of duplex communication, determining, by a base station, a carrier to be used by the user equipment to receive first-type information from the base station, wherein the first-type information comprises scheduling information;
   sending, by the base station, first information to the user equipment, wherein the first information includes a subframe pattern corresponding to the determined carrier and enabling the user equipment to determine the carrier according to the subframe pattern included in the first information, the subframe pattern indicating a subset of subframes, of a radio frame on the carrier, to be used by the user equipment to receive the first-type information from the base station; and
   transmitting, by the base station, the first-type information to the user equipment on the subset of the subframes on the carrier.

2. The method according to claim 1, wherein
prior to the sending, the first information is generated by the base station in accordance with a correspondence between the first information and the carrier, and according to the correspondence:
if the first information belongs to a first predetermined set, the carrier is a first carrier; or
if the first information belongs to a second predetermined set, the carrier is a second carrier.

3. The method according to claim 1, wherein the first information comprises one of the following:
a predetermined value and user equipment-specific information.

4. The method according to claim 3, wherein the first information comprises the user equipment-specific information, and the user equipment-specific information comprises one of the following:
a cell radio network temporary identifier C-RNTI and a temporary cell radio network temporary identifier TC-RNTI that correspond to the user equipment.

5. User equipment, comprising:
a transceiver, configured to receive first information sent by a base station, the first information including a subframe pattern corresponding to a carrier used for transmitting first-type information, the subframe pattern indicating a subset of subframes, of a radio frame on the carrier, to be used to transmit the first-type information on the carrier to the base station; and
a processor, configured to: in a case in which the user equipment is capable of transmitting uplink data and downlink data on the carrier, determine the carrier according to a correspondence between the carrier and the subframe pattern included in the first information, wherein
the transceiver is further configured to transmit the first-type information on the subset of the subframes on the determined carrier,
the first-type information comprises uplink data,
the subframe pattern indicates a ratio of a number of the subset of subframes to a number of other subframes in the radio frame on the carrier, and
the transceiver is further configured to receive, from the base station, downlink data or scheduling information on the other subframes.

6. The user equipment according to claim 5, wherein the processor is configured to determine the carrier used for transmitting the first-type information by:
determining, by the processor, whether the first information belongs to a first predetermined set or a second predetermined set; and
in a case in which it is determined that the first information belongs to the first predetermined set, determining, by the processor, to transmit the first-type information on a first carrier; or
in a case in which it is determined that the first information belongs to the second predetermined set, determining, by the processor, to transmit the first-type information on a second carrier.

7. The user equipment according to claim 5, wherein the first information comprises one of the following:
a predetermined value and user equipment-specific information.

8. The user equipment according to claim 7, wherein the first information comprises the user equipment-specific information, and the user equipment-specific information comprises one of the following:
a cell radio network temporary identifier C-RNTI and a temporary cell radio network temporary identifier TC-RNTI that correspond to the user equipment.

9. The user equipment according to claim 5, wherein
the transceiver is configured to transmit the first-type information on the determined carrier in the following manner: receiving, by the transceiver, downlink control information DCI on the determined carrier; and
the processor is further configured to: after the transceiver receives the DCI on the determined carrier, determine, according to the DCI, a carrier used for transmitting second-type information, wherein the second-type information comprises: uplink data and/or downlink data.

10. The user equipment according to claim 9, wherein the processor is configured to determine, in the following manner according to the DCI, the carrier used for transmitting the second-type information:
the DCI comprising: first indication information used for indicating that uplink transmission or downlink transmission is to be performed, and second indication information used for indicating a carrier, and determining, by the processor according to the first indication information and the second indication information, the carrier used for transmitting the second- type information.

11. A base station, comprising:
a processor, configured to: upon determining that a user equipment is capable of duplex communication, determine a carrier to be used by the user equipment to receive first-type information from the base station, wherein the first-type information comprises scheduling information; and
a transceiver, configured to send first information to the user equipment, wherein
the first information includes a subframe pattern corresponding to the determined carrier and enabling the user equipment to determine the carrier according to the subframe pattern included in the first information, and the subframe pattern indicates a subset of subframes, of a radio frame on the carrier, to be used by the user equipment to receive the first-type information from the base station and
the transceiver is further configured to transmit, to the user equipment, the first-type information on the subset of the subframes on the carrier.

12. The base station according to claim 11, wherein
prior to the sending, the processor generates the first information is in accordance with a correspondence between the first information and the carrier, and according to the correspondence:
if the first information belongs to a first predetermined set, the carrier is a first carrier; or
if the first information belongs to a second predetermined set, the carrier is a second carrier.

13. The base station according to claim 11, wherein the first information comprises one of the following:
a predetermined value and user equipment-specific information.

14. The base station according to claim 13, wherein the first information comprises the user equipment-specific information, and the user equipment-specific information comprises one of the following:
a cell radio network temporary identifier C-RNTI and a temporary cell radio network temporary identifier TC-RNTI that correspond to the user equipment.

15. The base station according to claim 11, wherein:

the transceiver is configured to transmit the first-type information on the carrier in the following manner: sending downlink control information DCI to the user equipment on the carrier determined by the base station, the DCI is used by the user equipment to determine, according to the DCI, a carrier used for transmitting second-type information, and the second-type information comprises: uplink data and/or downlink data.

16. The base station according to claim 15, wherein the DCI comprises: first indication information used for indicating that uplink transmission or downlink transmission is to be performed, and second indication information used for indicating a carrier.

17. The method according to claim 1, wherein the subframe pattern indicates a ratio of a number of the subset of subframes to a number of other subframes in the radio frame on the carrier, and the method further comprises receiving, by the base station, uplink data from the user equipment on the other subframes.

18. The base station according to claim 11, wherein the subframe pattern indicates a ratio of a number of the subset of subframes to a number of other subframes in the radio frame on the carrier, and the transceiver is further configured to receive, from the user equipment, uplink data on the other subframes.

\* \* \* \* \*